(12) United States Patent
Choi

(10) Patent No.: US 10,995,733 B2
(45) Date of Patent: May 4, 2021

(54) WIND POWER GENERATION DEVICE FOR WINDOW TRIM FRAME

(71) Applicant: Jae Sun Choi, Bucheon-si (KR)

(72) Inventor: Jae Sun Choi, Bucheon-si (KR)

(*) Notice: Subject to any disclaimer, the term of this patent is extended or adjusted under 35 U.S.C. 154(b) by 0 days.

(21) Appl. No.: 16/626,256

(22) PCT Filed: May 4, 2018

(86) PCT No.: PCT/KR2018/005222
§ 371 (c)(1),
(2) Date: Dec. 23, 2019

(87) PCT Pub. No.: WO2018/236048
PCT Pub. Date: Dec. 27, 2018

(65) Prior Publication Data
US 2020/0158088 A1 May 21, 2020

(30) Foreign Application Priority Data

Jun. 23, 2017 (KR) .................. 10-2017-0079420

(51) Int. Cl.
*F03D 9/00* (2016.01)
*H02P 9/04* (2006.01)
*F03D 9/34* (2016.01)
*F03D 9/11* (2016.01)
*F03D 13/20* (2016.01)
*F03D 1/02* (2006.01)

(52) U.S. Cl.
CPC ............... *F03D 9/34* (2016.05); *F03D 1/02* (2013.01); *F03D 9/11* (2016.05); *F03D 13/20* (2016.05)

(58) Field of Classification Search
CPC ..................................... F03D 9/34; F03D 13/20
See application file for complete search history.

(56) References Cited

U.S. PATENT DOCUMENTS

| 8,138,430 B1 * | 3/2012 | Ucero | H02G 3/128 |
|---|---|---|---|
| | | | 174/480 |
| 2010/0076615 A1 * | 3/2010 | Daniel | F03D 9/25 |
| | | | 700/293 |
| 2011/0221193 A1 | 9/2011 | Kalén et al. | |

FOREIGN PATENT DOCUMENTS

| CN | 2578705 Y | * 10/2003 |
|---|---|---|
| CN | 101876297 A | * 11/2010 |

(Continued)

OTHER PUBLICATIONS

KR Notification of Reason for Refusal dated Oct. 29, 2018 as received in Application No. 10-2017-0079420.

(Continued)

*Primary Examiner* — Tulsidas C Patel
*Assistant Examiner* — Thomas K Quigley
(74) *Attorney, Agent, or Firm* — Maschoff Brennan

(57) ABSTRACT

The disclosed invention relates to a wind power generation device for a window trim frame, the wind power generation device: enabling alignment and provision in a prefabricated manner so as to fit the size of a window trim frame or the window frame of a general house or a building such that the installation thereof is simplified; manufactured in a small size such that purchase and production costs are relatively lower than those of other power generation facilities and the like; and charging, with produced electric energy, a storage battery provided at the end thereof and, simultaneously, enabling a charging completion to be immediately checked, thereby easily being used.

3 Claims, 3 Drawing Sheets

(56) References Cited

FOREIGN PATENT DOCUMENTS

| | | | |
|---|---|---|---|
| CN | 207278158 U | * | 4/2018 |
| CN | 207776744 U | * | 8/2018 |
| EP | 2199998 A2 | * | 6/2010 ............. G08B 13/08 |
| JP | 2011163171 A | * | 10/2000 |
| JP | 2008-180126 A | | 8/2008 |
| KR | 10-0946198 B1 | | 3/2010 |
| KR | 10-1169184 B1 | | 7/2012 |
| KR | 10-1197322 B1 | | 11/2012 |

OTHER PUBLICATIONS

KR Notice of Final Rejection dated Feb. 27, 2019 as received in Application No. 10-2017-0079420.
KR Notice of Final Rejection dated Apr. 26, 2019 as received in Application No. 10-2017-0079420.

* cited by examiner

[FIG. 1]
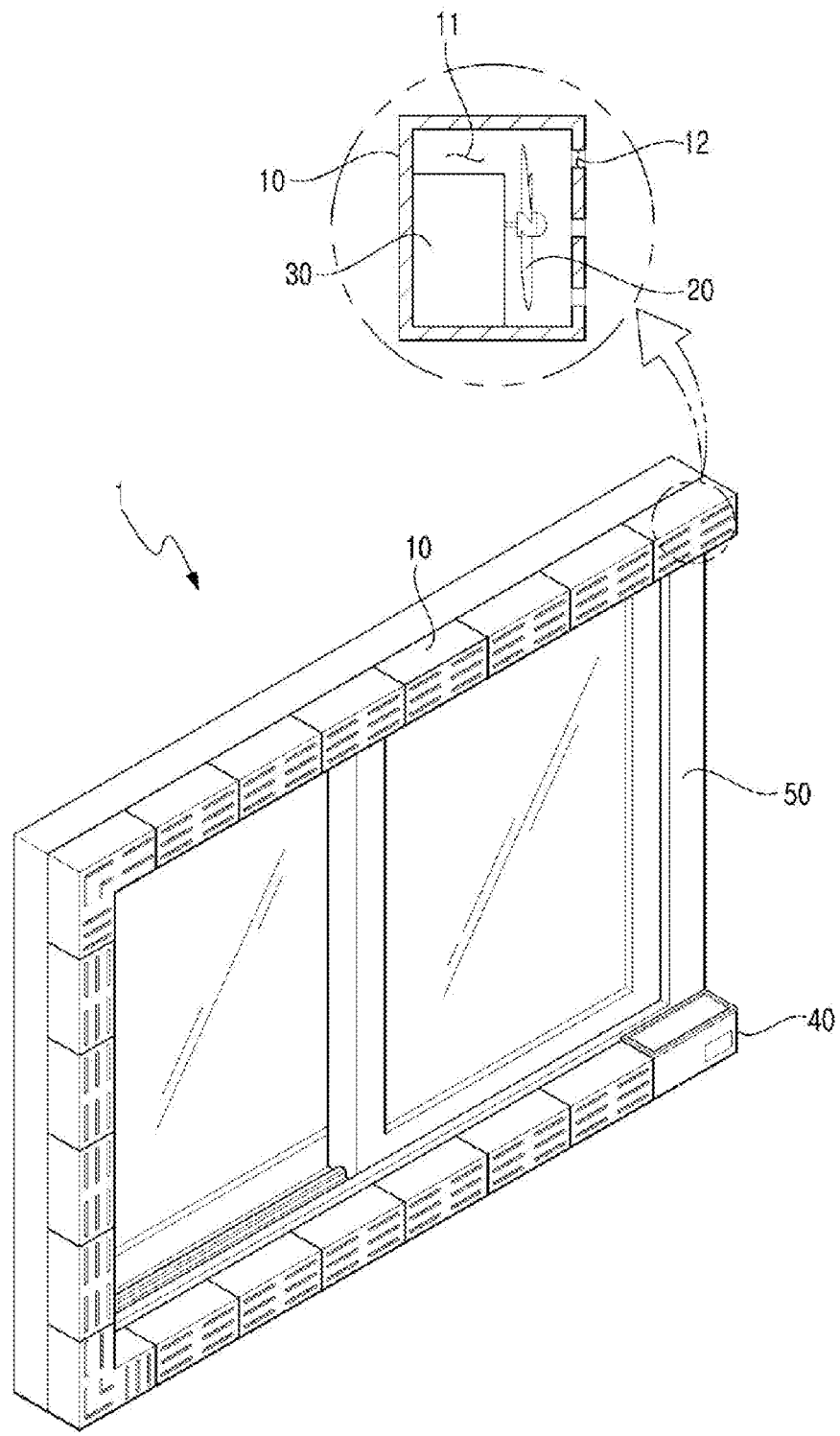

[FIG. 2]
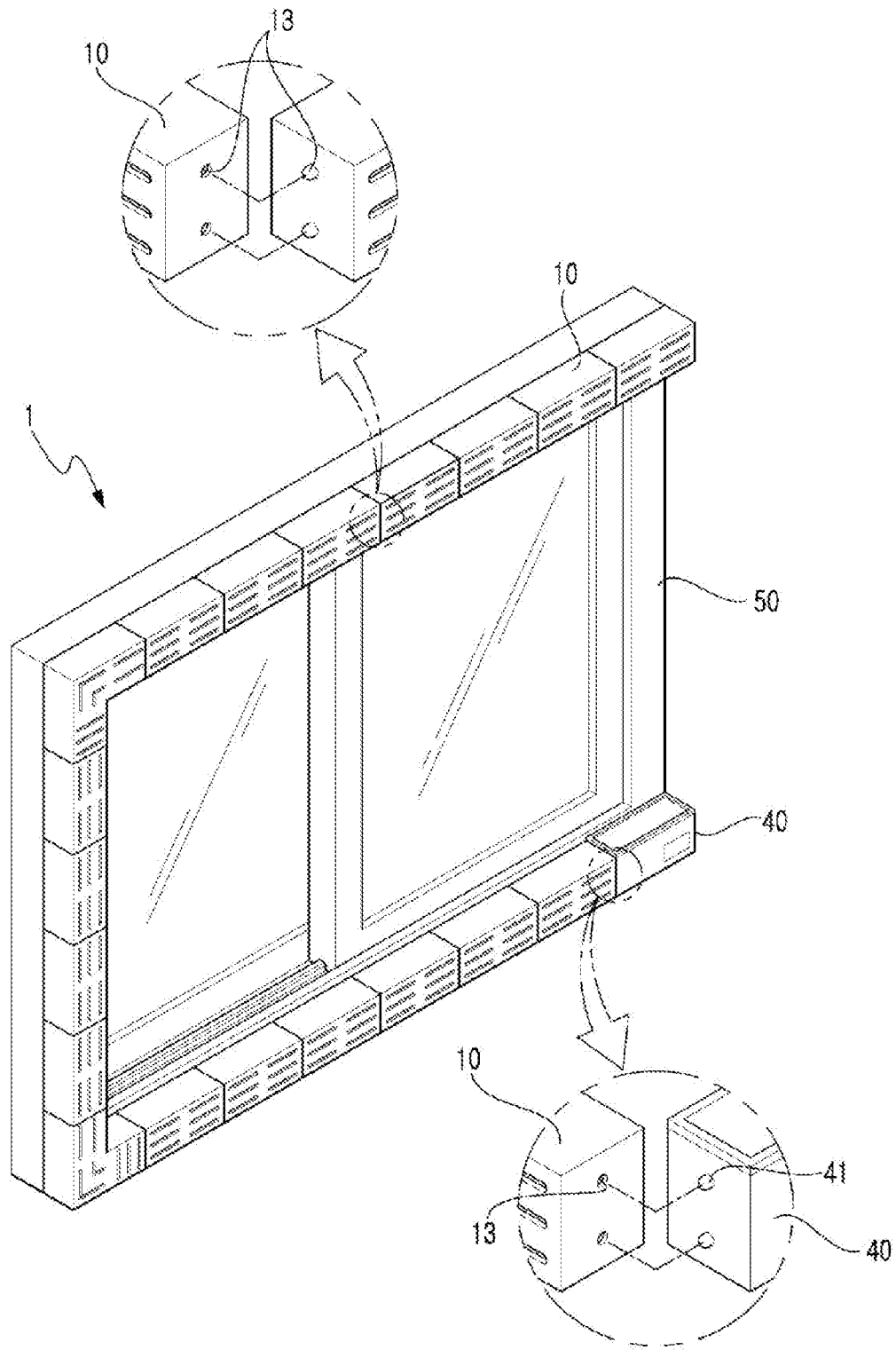

[FIG. 3]
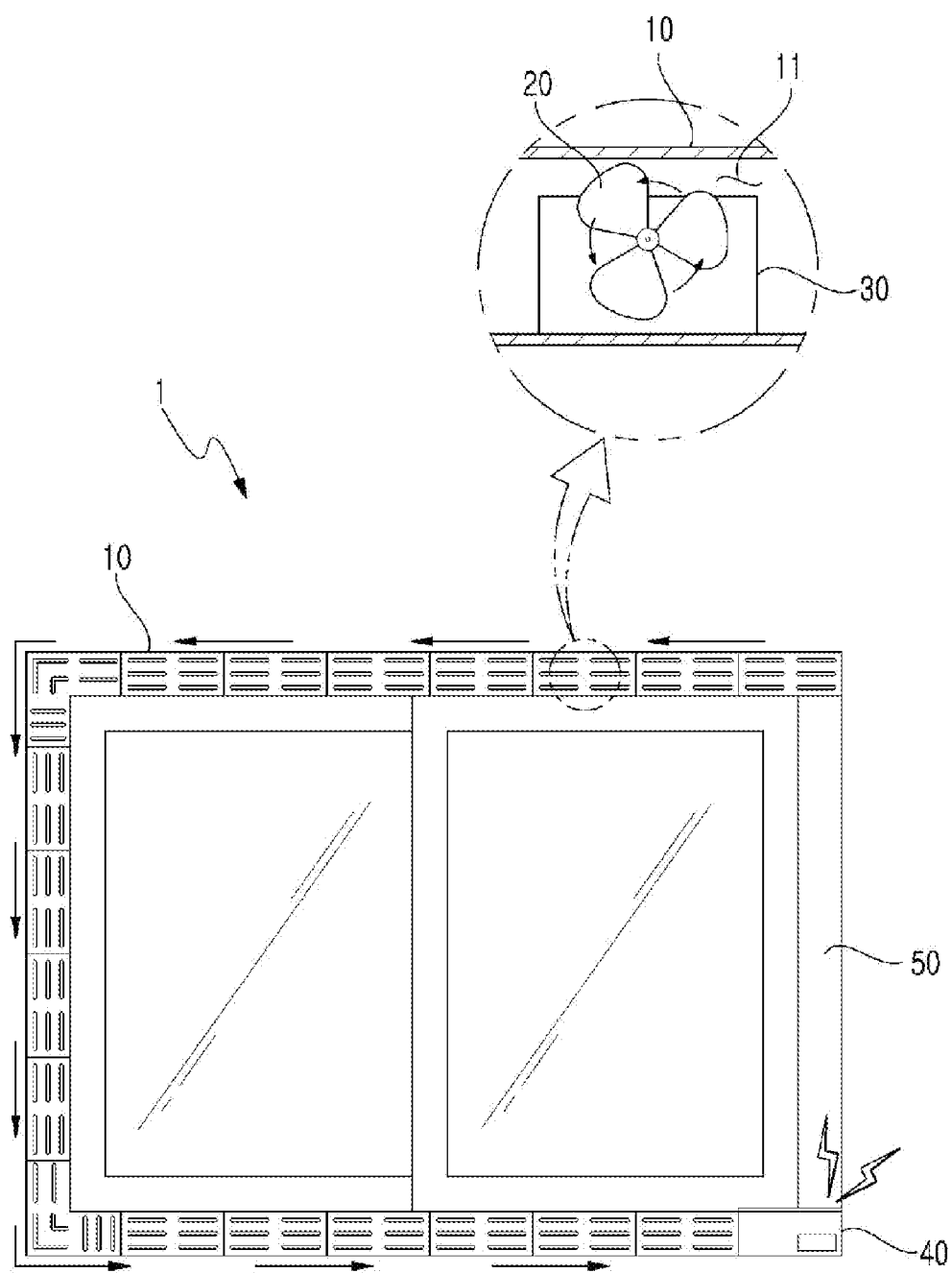

WIND POWER GENERATION DEVICE FOR WINDOW TRIM FRAME

TECHNICAL FIELD

The disclosure relates to a small-scale wind power generator installed and used in a typical house or building.

BACKGROUND ART

Wind power generation is a typical eco-friendly power generation method that uses wind to produce electricity. In particular, since the 1990s, the green power generation facility which is a green power plant has emerged as an alternative to thermal power generation and nuclear power generation due to the global greenhouse gas and climate problems, and is currently rapidly advancing.

Generally, a wind power generation apparatus has a principle of generating kinetic energy through rotational force of a blade to rotate a transmission gear of a transmission, and converting the kinetic energy into electric energy through a generator. The wind power generation apparatus may be classified into a horizontal axis wind power generation apparatus ("horizontal axis wind turbine") and a vertical axis wind power generation apparatus ("vertical axis wind turbine").

The wind power generation apparatus is usually installed on a large scale in windy mountainous areas or coastal areas. On the other hand, solar cell equipment, which is one of the eco-friendly power generation facilities, is frequently installed in houses and buildings.

However, the wind power generation apparatus installed in mountainous areas and/or coastal areas is difficult to move to other sites after installation and is disadvantageous in that the apparatus is installed on a large scale, thus involving high initial construction costs, although it is environmentally friendly.

In addition, in the case of solar cell equipment used in general houses or buildings, maintenance services may be possible by, for example, local governments. However, like the wind power generation apparatus, the solar cell equipment also needs high initial construction costs and entails a limitation of being usable only when solar energy can be supplied.

DISCLOSURE

Technical Problem

According to the disclosure, an object of the present invention is to provide a wind power generation apparatus (often referred to as a "wind turbine") for a window trim frame, which may be arranged and mounted on or along a window trim frame in a general house or building, and has a chargeable battery disposed at an end of the apparatus.

Technical Solution

In one embodiment, a wind turbine includes: a main body wherein a cutoff groove is formed in the front surface to allow inflow of external wind, a mounting space is formed therein, and connection terminals are provided on lateral sides so that plural main bodies are electrically connected to one another and arranged along a window trim frame by the connection terminals; a blade rotatably installed in the mounting space and rotated by the wind inflowing through the cutoff groove; a generator unit operatively installed in the mounting space and connected to a rotation axis of the blade so that rotational force of the blade is converted into electric energy; and a battery is detachably mounted on the window trim frame so as to be electrically connected to the main body disposed at the end among the plural main bodies, and is charged with electric power produced by the generator unit.

Advantageous Effects

As described above, the wind power generation apparatus for a window trim frame according to the present invention may be arranged and provided in a pre-fabricated manner to fit the size of a wind trim frame or a window frame in a general house or building so that installation thereof is simplified, the apparatus may be manufactured in a small size to thus require relatively lower purchase and production costs than other power generation facilities or the like, and may charge a battery disposed at the end thereof with produced electric energy while immediately checking when charging is completed, thereby being easily used.

DESCRIPTION OF DRAWINGS

FIG. 1 is a perspective view of the wind turbine for a window trim frame according to one embodiment of the present disclosure.

FIG. 2 is a partially exploded perspective view of the wind turbine for a window trim frame according to one embodiment of the present disclosure.

FIG. 3 is a use state diagram of the wind turbine for a window trim frame according to one embodiment of the present disclosure.

DESCRIPTION OF REFERENCE NUMERALS

1: Wind turbine for window trim frame
10: Main body
11: Mounting space
12: Cutoff groove
13,41: Connection terminals
20: Blade
30: Generator unit
40: Battery
50: Window trim frame

BEST MODE

The advantages and features of the disclosed subject matter and how to accomplish the same will become apparent with reference to the embodiments described in detail below as well as the accompanying drawings. However, it is to be understood that the disclosure is not limited to the embodiments set forth herein, but may be embodied in many different forms. In fact, the embodiments are provided only to fully disclose the scope of the present invention to those skilled in the art, and the present invention is only defined by the scope of the appended claims. The same numerals refer to the same elements throughout the specification.

A detailed description of known functions and configurations incorporated herein will be omitted when it is considered to make the subject matter of the present disclosure obscure. It is to be understood that the terminology used herein is defined for purpose of describing particular embodiments in the disclosure only and may vary depending upon intentions of users or operators and/or practices in the art. Therefore, the definition of the terminology should be based on the contents of the present specification.

FIGS. 1 to 3 illustrate an example in accordance with one embodiment of the disclosure. FIG. 1 is a perspective view, FIG. 2 is a partially exploded perspective view and FIG. 3 is a use state diagram.

Hereinafter, the wind turbine 1 for a window trim frame according to an embodiment of the present invention will be described in detail with reference to FIGS. 1 to 3.

First, referring to FIG. 1, a plurality of main bodies 10 is arranged and mounted along a window trim frame 50. Each main body 10 serves to accommodate constituent members described hereinafter. Further, neighboring main bodies 10 may be electrically connected to one another to transmit produced electric energy to a battery 40 described later.

For these purposes, the main body 10 may include a cutoff groove 12 through which external wind can inflow on the front surface thereof, and a mounting space 11 formed therein. Further, connection terminals 13 may be provided on lateral sides of the main body so that plural main bodies are electrically connected to one another along a window trim frame 50 by the connection terminals 13.

As such, the main bodies may be configured such that the main body 10 in a straight shape is provided in vertical and horizontal sections of the window trim frame 50 while the main body in a bent shape is provided in a corner section thereof. The main body 10 may be fixed to the window trim frame or detachably mounted thereon. In the case of being fixedly mounted, the main body may be fixed and mounted on the window trim frame while the plural main bodies are connected to one another by the connection terminals 13. In the case of being mounted in a detachable manner, the number of the main bodies to be mounted may be altered depending upon environmental factors such as season, air volume, etc. in other words, in a case where the air volume is large, a larger number of main bodies 10 may be arranged and mounted so as to produce greater electric energy.

Although not shown, the main body 10 may be detachably mounted on the window trim frame 50 by magnetic force of a metal-magnetic member. Alternatively, a separate fastening bracket may be provided on the window trim frame 50 to which the main body 10 may be detachably coupled. In addition, a sliding rail may be provided on the window trim frame 50 and then the main body 10 may be slidingly coupled thereto. As described above, one of the attachment and detachment methods according to the prior art may be selected.

Next, referring to FIG. 2, the connection terminals 13 are configured such that one connection terminal 13 on one side is convex while the other connection terminal 13 on the opposite side is concave in a direction in which one main body 10 and another main body 10 are in contact with each other, whereby the convex connection terminal 13 is inserted and coupled in the concave connection terminal 13. Like the detachment and attachment methods of the main body 10, any of conventional electrical connection methods may be selected and used for the connection terminals 13 described above. That is, connection may be performed in the form of wires other than the connection terminal 13.

The main body 10 may be mounted not only on the window trim frame 50 but also on a window frame. Further, it may of course be mounted on a roof structure, an outer wall, a pillar, etc. of the building. Additionally, a size of the main body may also be differently defined.

On the other hand, a blade 20 is rotatably provided in the mounting space 11. The blade 20 is rotated by external wind and serves to transmit the rotational force to a generator unit 30 described later. The blade 20 is substantially the same as the blade in the conventional generator according to the prior art and a detailed description thereof will be omitted for simplification of the description.

In the mounting space 11 described above, the generator unit 30 is operatively provided. The generator unit 30 is mounted at the rear of the blade 20 and connected to a rotation axis of the blade 20 to convert rotational, force of the blade 20 into kinetic energy and electric energy, respectively. To this end, the generator unit 30 may be provided with a transmission and a generator. That is, when the blade 20 is rotated, its rotation axis spins a transmission gear of the transmission to generate kinetic energy. Then, this kinetic energy is converted into electric energy by the generator. The produced electric energy may be supplied to a battery 40 described later via the connection terminals 13 connected to each other. To this end, the generator unit 30 is electrically connected to the connection terminals 13. Such a generator unit 30 as described above may be operated on the same principle as applied to the conventional transmission and generator for wind power generation according to the prior art, therefore, a detailed description thereof will be omitted for simplification of the specification.

Further, referring to FIG. 3, among the plurality of main bodies 10 mounted on the window trim frame 50, the main body 10 disposed at the end thereof is provided and electrically connected with the battery 40. The battery 40 may be charged with the electric energy produced and collected from a plurality of generator units 30. The battery 40 may be detachably mounted on the window trim frame 50, and may be provided with connection terminals 41 to be electrically connected to the connection terminals 13 of the main body 10. Since the battery 40 may be located on the window trim frame 50, that is, the outside, a signal indicating when the battery is fully charged with electric energy may be transmitted to a user. In other words, the transmitted signal may be received by a portable terminal or PC of the user, which in turn, can inform the user of the fully charged state of the battery 40. Furthermore, a separate receiver may be installed inside a room to receive the fully charged state information signal. To this end, a separate circuit may be provided inside the battery 40 in order to transmit a signal upon completion of charging.

Two or more batteries 40 are preferably provided such that the fully charged battery 40 is separately used while the other battery 40 for charging is mounted on the window trim frame. Although not shown, the battery 40 may have an insert hole into which a 220V power cord is inserted or a USB terminal is fitted.

According to the above description, the wind turbine 1 for a window trim frame 1 may be arranged and provided in a pre-fabricated manner to fit the size of a window trim frame 50 or a window frame in a general house or building so that installation thereof is simplified, and the wind turbine may be manufactured in a small size to thus require relatively lower purchase and production costs than other power generation facilities or the like, and may charge a battery 40 disposed at the end thereof with produced electric energy while immediately checking when charging is completed, thereby being easily used.

It will be understood by those skilled in the art that the above disclosure is provided for illustrative purpose only, and various modifications may be made and implemented without departing from the spirit and scope of the invention as defined by the appended claims. Therefore, the protected scope of the disclosure is not limited to the above specific embodiments.

INDUSTRIAL APPLICABILITY

The disclosed contents are applicable to small wind power generation using a window trim frame of a house or a building.

The invention claimed is:

1. A wind power generation apparatus for a window trim frame, comprising:
   a main body wherein a cutoff groove is formed in the front surface of the main body to allow inflow of external wind, a mounting space is formed therein, and connection terminals are provided on lateral sides so that plural main bodies are electrically connected to one another and arranged along a window trim frame by the connection terminals;
   a blade rotatably provided in the mounting space and rotated by a wind inflowing through the cutoff groove;
   a generator unit operatively provided in the mounting space and connected to a rotation axis of the blade so that rotational force of the blade is converted into electric energy; and
   a battery is detachably mounted on the window trim frame so as to be electrically connected to the main body disposed at the end among the plural main bodies, and is charged with the electric energy produced by the generator unit.

2. The apparatus according to claim 1, wherein the main bodies are configured such that the main body in a straight shape is provided in vertical and horizontal sections of the window trim frame while the main body in a bent shape is provided in corner sections thereof.

3. The apparatus according to claim 2, wherein the battery transmits a signal informing a user of when the battery is fully charged with the electric energy.

* * * * *